J. T. DUNCAN.
STEERING DEVICE FOR AUTOMOBILES.
APPLICATION FILED AUG. 16, 1920.
1,401,398.
Patented Dec. 27, 1921.
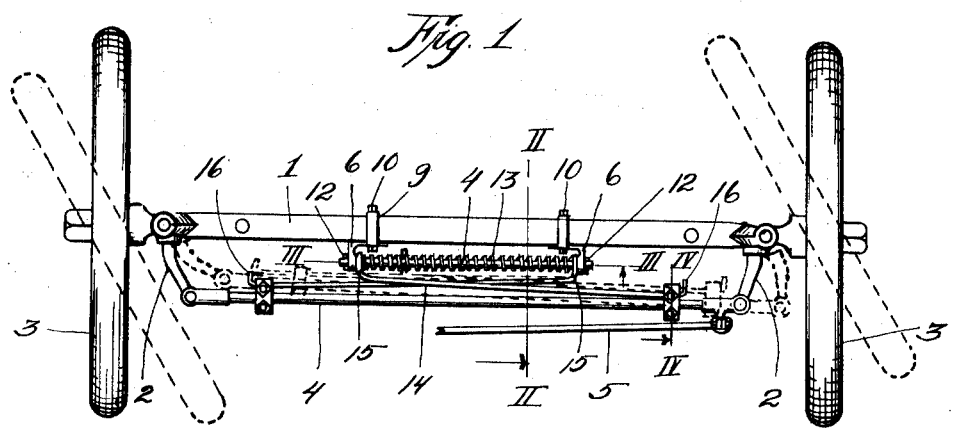
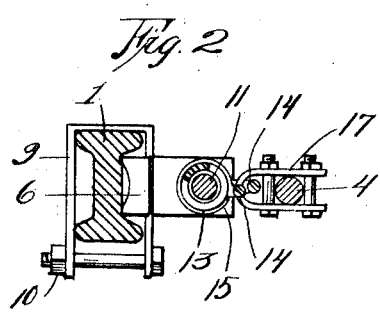
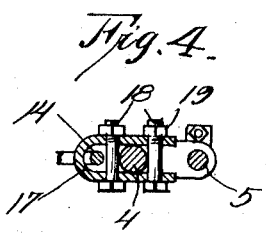
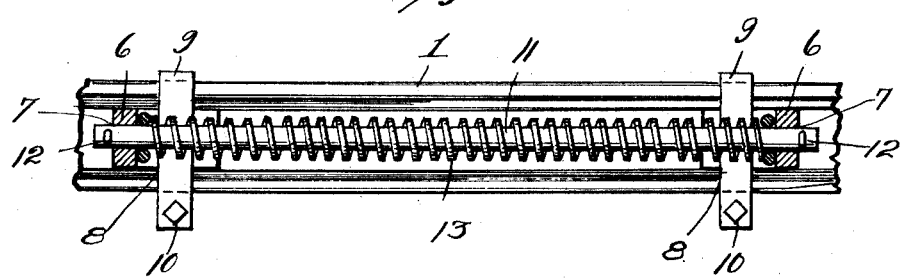
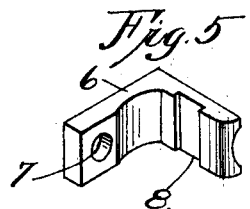
Witness:
R. Hamilton
Inventor
Joseph T. Duncan.
By Thosper Gerard
Attorney

UNITED STATES PATENT OFFICE.

JOSEPH T. DUNCAN, OF LONG BEACH, CALIFORNIA.

STEERING DEVICE FOR AUTOMOBILES.

1,401,398.	Specification of Letters Patent.	Patented Dec. 27, 1921.

Application filed August 16, 1920. Serial No. 403,764.

*To all whom it may concern:*

Be it known that I, JOSEPH T. DUNCAN, citizen of the United States, and resident of Long Beach, county of Los Angeles, State of California, have invented a certain new and useful Improvement in Steering Devices for Automobiles, of which the following is a complete specification.

This invention relates to steering devices for automobiles, and more especially to that class of such devices which exert yielding force tending to maintain the front wheels of the car at right angles to their axes, for the purpose of causing the car to travel in an undeviating or straight course, and my object is to produce a simple, strong, durable and cheap device which can be easily and quickly applied in or removed from operative position on a car by an unskilled person.

With this object in view, the invention consists in certain novel and useful features of construction and combinations of parts as hereinafter described and claimed; and in order that it may be fully understood, reference is to be had to the accompanying drawing, in which:—

Figure 1, is a plan view of the front axles and wheels of a motor car equipped with a steering device embodying the invention.

Fig. 2, is a vertical section on the line II—II of Fig. 1.

Fig. 3 is an enlarged vertical section taken on the line III—III of Fig. 1.

Fig. 4 is a vertical section taken on the line IV—IV of Fig. 1, the section being on an enlarged scale.

Fig. 5 is a detail perspective view of a bracket forming part of the equipment.

In the said drawing, 1 indicates the said axle, 2 the steering knuckles, 3 the front wheels and 4 the connecting rod for the rear arm of the steering knuckles, there being also the customary rod 5 for transmitting power from the steering wheel to the rod 4 for the purpose of causing the car to travel in the proper course. All of the parts mentioned are common and well known construction.

The steering device embodying the invention is constructed as follows:

A pair of right angle shaped brackets 6 arranged horizontally with their rearwardly projecting arms provided with perforations 7, and provided with vertical grooves in their inwardly projecting arms which fit against the channeled rear face of the axle 1, said grooves or recesses receiving legs of a pair of inverted U-shaped clips 9 fitting over the axle and clamped firmly thereto by fastening devices 10 comprising bolts and nuts. These fastening devices including the clips, and the channeled face of the axle, hold the brackets fixed rigidly in position so as to reliably support a horizontal rod 11 extending through the perforations 7 of the brackets and retained in position by spring-cotters 12.

A stiff spring 13 is coiled around the rod 11 and is placed under compression thereon, and arranged adjacent the said rod 11 in crossed relation is a pair of pull-rods 14, the same terminating at corresponding ends in eyes 15 fitting on the rod 11 with a slidable relation and interposed between the brackets 6 and the adjacent ends of the spring 13. The said rods terminate at their opposite ends in hooks 16 and extend slidingly through a pair of clips 17 secured by clamping bolts 18 and nuts 19 in fixed position upon the rod 4.

With the parts in the position shown by full lines in Fig. 1, it will be apparent that the pressure of the spring 13 on the eyes 15 of the crossed pull rods 14, tends to hold the wheels in position for traveling in a straight line, that is, at right angles to the axle. When the driver imparts such movement to the steering wheel as shall move the rod 4 endwise to the right, the wheels are turned more or less in the direction indicated by the dotted line so that a turn is made to the left, reversed movement of the turning wheel back to normal position restoring the wheels 3 to their initial position, and continued movement of the steering wheel in the direction last mentioned will, of course, effect turning movement of wheels 3 to the right to cause the car to turn in that direction. In the turning movement of the wheels out of their normal position, the spring 13 is further tensioned by the pull-rod 14 which is moved, that is to say, when the car is turned to the left, the right hand pull-rod compresses the spring as indicated by the dotted line in Fig. 1. When the car is turned in the reverse direction, the left hand pull-rod 14 performs the same function. It will thus be seen that turning movements of the steering wheel are opposed by the spring 13, except when the wheels are being turned back to their normal or straight position, and it will likewise be apparent that should the wheels be deflected to the right or the left by encountering rough ground or rock or the like in the road-way, the spring 13 will resist such deflection and return the wheels to normal position immediately the obstruction is passed, that is to say, the spring 13 exerts equal pressure against the eyes 15 of the two pull-rods and hence tends to hold the wheels 3 with a yielding force, for travel in a straight course, and therefore, relieves the operator of the strain of maintaining the wheels in proper course, particularly when traveling along one side of a crowned road. In fact, with this steering attachment, the car will travel in a direct course in the same manner that a car will so travel provided with what is known as the irreversible steering connection, such as found on all of the large cars and some of the smaller ones, the attachment, therefore, being valuable only in connection with a car of that type in which the steering wheel movement is transmitted back to the steering wheel.

It will be apparent, of course, that when the rod 4 moves to the right or the left, it applies pressure on the hook end 16 of the engaging rod 14, and that movement of such rod for the purpose of compressing the spring, does not in any wise affect the companion rod 4 because the rods fit slidingly in the clips 17 and move therewith only when the clips apply pressure on the said hook-ends.

From the above description, it will be apparent that I have produced a steering device of exceedingly simple, strong, durable and inexpensive construction, and which can be readily and easily applied to a car by an unskilled person without special tools, and that the invention is susceptible of modification in minor particulars without departing from the principle of construction involved or sacrificing any of the advantages of the appended claims.

I claim:

1. The combination with a front axle and knuckle-connecting rod of an automobile, of a pair of arms rigid with and projecting from the axle toward said rod, a rod carried by said arms in parallel relation to the axle, a pair of clips clamped on the said knuckle-connecting rod, a pair of rods respectively slidingly engaged with said clips and slidingly connected to the rod carried by said arms and provided at their outer ends with hooks incapable of passing through the respective clips, and a tensioned coil spring mounted upon the rod and exerting pressure at its outer ends against said pair of rods and tending to clamp the same yieldingly against the adjacent arms projecting from the axle.

2. The combination with a front axle and knuckle-connecting rod of an automobile, of a pair of arms rigidly secured to and projecting rearwardly from the axle, a rod mounted in said arms, a pair of clips clamped upon the knuckle-connecting rod, a pair of crossed pull-rods extending slidingly through said clips respectively and terminating at the outer side of the clips in hooks, and provided at their inner ends with eyes slidingly engaging the said rods carried by the arms projecting from the axle, and a coiled spring fitting around the said rod and exerting yielding force to hold the said pull-rods against the said arms rigid with the axle.

3. The combination with the front axle and knuckle-connecting rod of an automobile, a pair of right angle shaped brackets arranged horizontally and fitting against the front side of the axle and provided with vertical grooves respectively, clips embracing the axle and said angle brackets and extending through the grooves of the latter, means for clamping the clips firmly in place with the said angle brackets rigidly secured to the axle, a rod extending through said angle brackets, a pair of clips rigidly secured on the knuckle-connecting rod, a pair of crossed rods extending slidingly through said clips respectively and provided outward of said clips with hook-ends incapable of passing through the clips and provided at their inner ends with forwardly projecting eyes slidingly fitting on the said rods between the ends of said spring and the said angle brackets.

In testimony whereof I hereunto affix my signature.

JOSEPH T. DUNCAN.